(12) United States Patent
Grunder et al.

(10) Patent No.: US 10,814,435 B2
(45) Date of Patent: Oct. 27, 2020

(54) CUTTING INSERT, CUTTING TOOL COMPRISING SUCH AN INSERT AND METHODS FOR PRODUCING AND REPAIRING SUCH A TOOL

(71) Applicant: DIAMONDE, Marlenheim (FR)

(72) Inventors: Timothée Grunder, Rosheim (FR); Anne Piquerez, Kirchheim (FR)

(73) Assignee: Diamonde, Marlenheim (FR)

(*) Notice: Subject to any disclaimer, the term of this patent is extended or adjusted under 35 U.S.C. 154(b) by 466 days.

(21) Appl. No.: 15/039,996

(22) PCT Filed: Nov. 28, 2014

(86) PCT No.: PCT/FR2014/053077
§ 371 (c)(1),
(2) Date: May 27, 2016

(87) PCT Pub. No.: WO2015/079183
PCT Pub. Date: Jun. 4, 2015

(65) Prior Publication Data
US 2017/0001267 A1    Jan. 5, 2017

(30) Foreign Application Priority Data

Nov. 29, 2013 (FR) .................................. 13 61836
Nov. 28, 2014 (FR) .................................. 14 61637

(51) Int. Cl.
*B32B 9/00* (2006.01)
*B23C 5/18* (2006.01)
(Continued)

(52) U.S. Cl.
CPC .............. *B23K 31/025* (2013.01); *B23C 5/18* (2013.01); *B23D 61/028* (2013.01); *B23D 61/04* (2013.01);
(Continued)

(58) Field of Classification Search
None
See application file for complete search history.

(56) References Cited

U.S. PATENT DOCUMENTS 3,667,099 A * 6/1972 Palmer .................. B23B 27/148
428/557
3,676,086 A * 7/1972 Chay ...................... B32B 15/01
428/539.5

(Continued)

FOREIGN PATENT DOCUMENTS

JP    2005186214    *  7/2005

OTHER PUBLICATIONS

English machine translation of USUI (JP 2005-186214), EPO, accessed Apr. 30, 2018.*
(Continued)

*Primary Examiner* — Xiaobei Wang
(74) *Attorney, Agent, or Firm* — Renner Kenner Greive Bobak Taylor and Weber

(57) ABSTRACT

The invention relates to an insert brazed on a body of cutting tools (101), consisting of: a metal substrate (11), in the form of plates, having a surface for attachment to the tool body; a high-temperature, brazing, alloy layer (12); an intermediate layer; and a ceramic plate (14). The brazing alloy layer connects the metal substrate (11) of the ceramic plate (14) via the metal layer (13). A low-temperature brazing layer (1) connects the insert (1, 1') to the body of the tool (101).

12 Claims, 5 Drawing Sheets

(51) Int. Cl.
*B23C 5/20* (2006.01)
*B23D 61/04* (2006.01)
*B23K 1/00* (2006.01)
*B23P 15/28* (2006.01)
*B32B 15/04* (2006.01)
*B23K 31/02* (2006.01)
*B23K 35/30* (2006.01)
*B23D 61/02* (2006.01)
*C04B 37/02* (2006.01)
*B23K 1/20* (2006.01)
*B23K 35/02* (2006.01)
*B32B 9/04* (2006.01)
*B32B 15/18* (2006.01)
*C04B 37/00* (2006.01)
*B23K 101/20* (2006.01)
*B23K 103/18* (2006.01)
*B23K 103/00* (2006.01)
*B23K 103/16* (2006.01)

(52) U.S. Cl.
CPC ............ *B23K 1/0008* (2013.01); *B23K 1/203* (2013.01); *B23K 35/0222* (2013.01); *B23K 35/0233* (2013.01); *B23K 35/0238* (2013.01); *B23K 35/0244* (2013.01); *B23K 35/30* (2013.01); *B23K 35/3006* (2013.01); *B23P 15/28* (2013.01); *B32B 9/005* (2013.01); *B32B 9/041* (2013.01); *B32B 15/18* (2013.01); *C04B 37/006* (2013.01); *C04B 37/026* (2013.01); *B23C 2224/04* (2013.01); *B23C 2226/18* (2013.01); *B23C 2240/08* (2013.01); *B23K 2101/20* (2018.08); *B23K 2103/172* (2018.08); *B23K 2103/18* (2018.08); *B23K 2103/26* (2018.08); *B23K 2103/52* (2018.08); *B32B 2255/205* (2013.01); *C04B 2235/6581* (2013.01); *C04B 2237/122* (2013.01); *C04B 2237/125* (2013.01); *C04B 2237/126* (2013.01); *C04B 2237/127* (2013.01); *C04B 2237/343* (2013.01); *C04B 2237/348* (2013.01); *C04B 2237/36* (2013.01); *C04B 2237/401* (2013.01); *C04B 2237/406* (2013.01); *C04B 2237/55* (2013.01); *C04B 2237/60* (2013.01); *C04B 2237/72* (2013.01)

(56) References Cited

U.S. PATENT DOCUMENTS

2003/0035975 A1* 2/2003 Shinkai ............ B23K 1/19
428/554
2008/0063889 A1* 3/2008 Duckham ............ B23K 1/0006
428/615

OTHER PUBLICATIONS

Yoshihisa Sechi, "Effect of composition of titanium in silver-copper-titanium braze alloy on dissimilar laser brazing of binder-less cubic boron nitride and tungsten carbide", IOP Conference Series: Materials Science and Engineering, vol. 61, 2014, 012019, pp. 1-8 (Year: 2014).*

Morgan Advanced Materials, "Braze Alloys—Incusil", https://datasheets.globalspec.conn/ds/3022/MorganAdvancedMaterials/443C50D8-9F2B-44B3-A9D9-E6DA66ED9DF8, accessed Feb. 7, 2019. (Year: 2019).*

Gilliland et al., "Improved Brazing Methods for Tungsten Carbide Tool Bits", Welding Research Supplement to the Welding Journal, Jul. 1971, pp. 267-274. (Year: 1971).*

* cited by examiner

CUTTING INSERT, CUTTING TOOL COMPRISING SUCH AN INSERT AND METHODS FOR PRODUCING AND REPAIRING SUCH A TOOL

DISCLOSURE OF THE INVENTION

This invention concerns the general technical field of cutting tools used for machining or cutting wood and/or wood-based composite materials and derivatives.

More particularly, the invention concerns a process for manufacturing cutting tools and a process for repairing such cutting tools.

This invention also concerns the manufacturing of cutting inserts attached to the tool body.

STATE OF THE TECHNIQUE

The cutting tools used for working wood-based composite materials have inserts often made of a diamond powder mechanically linked with a substrate, for instance, metal carbide. The cutting inserts are then cut from this subassembly in order to be brazed to a tool body.

Brazing is at low temperature and at atmospheric pressure, using a brazing alloy, for instance based on the copper and silver.

Electric sharpening is then performed, for instance by the electroerosion of the cutting inserts attached to the tool body.

The relatively high cost of these cutting tools is essentially linked to the use of diamonds. Mandatorily, this results in high manufacturing and repair costs for these cutting tools.

It has been considered replacing the diamonds by another more economical material for producing cutting tools. Tests have been performed with cutting inserts made of nitride bearing ceramics, for instance $Si_3N_4$. To braze materials such as this to a steel tool body, pre-treatment is essential. In addition, brazing must be carried out in a vacuum furnace at temperatures of almost 1000° C. for a duration of approximately 10 to 15 minutes.

The implementation of brazing like this requires a complex and costly installation. In addition, the ceramic materials used have a very low thermal expansion coefficient compared to that of steel, favouring the appearance of stresses of a mechanical origin during cooling.

Furthermore, the high brazing temperature can cause the de-tempering of the steel, resulting in the alteration of the mechanical properties of the material and, thereby, of the cutting tool.

Also note that all the cutting inserts must be brazed simultaneously, meaning that the tool body must be held by a tool specially developed for each different tool geometry.

Repairing such a tool is difficult and expensive because the cutting inserts cannot be de-brazed individually.

There is also a known manufacturing method for a cutting tool, for instance as disclosed in document WO 00/15355. A cutting tool such as this comprises cutting inserts of cermet attached to the tool body, for instance by brazing. Prior to the brazing operation, the surfaces to be assembled together by a brazing alloy are cleaned by electrolysis and undergo chemical treatment. A metal coating is also applied to these faces. Even if the described implementation examples allow low-temperature brazing and the use of standard brazing alloys, it still remains that these examples are based partly on cermet adapted to electrolysis and also on the use of chemical surface treatment.

These are lengthy and complex operations to implement. In addition, the reliability of the bond between the cutting inserts and the tool body can only be mastered with difficulty. Indeed, the dissimilarity of the physical properties of the cermet cutting inserts and of the substrate very often causes differential thermal connotation which can favour the separation of the cutting insert while damaging the ceramic material.

Similarly, the bond obtained at low temperature between the cermet and the metal layer obtained by electrolytic deposit is hardly satisfactory because, at low temperature, the cermet does not absorb the metal. The bond obtained with the metal layer is therefore very weak.

There are various documents about the technical situation concerning the brazing of ceramic components to obtain tool components. Examples are to be found in the following documents: PCT 2005/042572, U.S. Pat. No. 3,667,099, EP 0129 314.

In the document EP 0 104 063 a method for the production of a boron nitride component attached to a carbide support is also described. This method concerns specifically a nitride which is part of the non-oxide ceramics and which is also a compound formed from and agglomerate crystal powder in a metal matrix; it will not allow application to cutting tools for highly abrasive materials such as wood, in particular reconstituted wood or particleboard composites.

A cubic boron nitride compound such as this does not represent any particular difficulties during brazing specifically because of its composite nature.

The document U.S. Pat. No. 3,667,099 describes a method for brazing a boron nitride part onto steel by brazing onto a coat of pure copper on a tungsten carbide support which, in order to adapt the dilatation coefficients, is then attached by low-temperature brazing. As in the previous document, these materials comprise nitride crystal powder assembled by metal binders. But these nitrides may be unsuitable for cutting tools working under the brutal conditions encountered in the machining of highly abrasive materials.

There is also a known method of producing ceramic brazing alloys using a film of plating metal applied to the ceramic before brazing with a reactive element such as Ti, Hf, Va. According to this document, the method consists of a gas-tight bond formed between a metal and a ceramic, while avoiding the difficulties linked to the tightness defects that dilatation can cause. All of these known techniques concern nitrites and cermet.

PURPOSE OF THE INVENTION

The purpose of this invention is to overcome the drawbacks of the prior art by developing a cutting or machining tool for wood and/or wood-based composite materials, comprising ceramic oxide cutting inserts having the physical characteristics required for machining word: thermodynamic stability, hardness and consistency, among others.

The purpose of this invention is also to develop a process for the production and repair of a cutting or machining tool capable of being implemented quickly and economically, and in particular, a process for the manufacturing of cutting inserts in the form of ceramic oxide cutting plates integral with a substrate metal and designed to be attached to a tool body.

OUTLINE AND ADVANTAGES OF INVENTION

For this purpose, the aim of the invention is a cutting insert to be brazed to a cutting tool body and having, superposed and assembled together, a metal substrate in the form of a plate with a fastening surface to the tool body, a high-temperature brazing alloy layer, an intermediate metal layer, an alumina ceramic plate of zirconia-yttria or a combination of such compounds, with the brazing alloy layer attaching the metal support to the ceramic insert by means of the metal layer, and wherein the high-temperature brazing alloy is a silver-copper alloy with more than 50% by volume of silver or an alloy.

According to one characteristic, the metal substrate is re-linked with the brazing alloy layer by means of a metal layer.

According to another characteristic, the metal substrate is of steel, nickel steel or tungsten carbide of a specific grade.

According to another characteristic, the ceramic plate is of alumina, zirconia or zirconia-yttria.

According to the invention, the I-temperature brazing alloy is an alloy of silver-copper Ag—Cu with more than 50% by volume of silver Ag or an alloy Ag—Cu with the addition of Zn, Mn and Ni.

The purpose of the invention is also a cutting tool comprising a tool body whose active surface is aligned with cutting inserts as defined above, these cutting inserts being connected to the tool body by a low-temperature brazing alloy.

This tool is particularly advantageous because it allows the replacing by the unit of such and such a damaged or worn and cutting insert without the replacement de-brazing the other teeth not concerned by the maintenance operation and not affecting the physical integrity of the other cutting plates not concerned by a replacement. The low-temperature brazing alloy of the cutting tool according to the invention is advantageously a silver-copper alloy Ag—Cu containing at least 60% by volume of silver Ag.

The invention also concerns a production method of a cutting tool comprising a metal body designed to be mounted to a machine and at least one cutting insert integral with the tool body, consisting in attaching the cutting insert to the metal tool body, characterized in that it consists in using a plate produced with at least one ceramic oxide, chosen from a family of ceramic grades containing alumina in a pure alpha form or pure tetragonal zirconia-yttria, or an alumina-zirconia-yttria composite, partially stabilized with at least 10% of zirconia, or an alumina-pure zirconia, not stabilized with at the most 16% of zirconia or a zirconia-alumina composite with at least 20% of alumina in alpha form and a metal substrate plate of approximately the same size as the ceramic plate, applying a first brazing alloy between the ceramic plate and the metal substrate plate produced from a material chosen from tungsten carbide and steel, with the tungsten carbide composite containing at least 10% cobalt and nickel steel (C45), in particular based on steel (16MnCr15) or steel (C45), and a metal layer deposited between the ceramic plate and the first brazing alloy; brazing the ceramic plate to the substrate plate by high-temperature vacuum brazing with the first brazing alloy: the high-temperature brazing alloy is a silver-copper alloy with more than 50% by volume of silver or an alloy. Cutting from the assembly obtained in this way the cutting inserts, brazing the cutting insert to the tool body by brazing at atmospheric pressure and low temperature with a second brazing alloy.

According to one characteristic of the production method, in the course of step b) a layer of metal material is applied to one of the faces of the ceramic plate and to one of the faces of the substrate plate, with these faces brought into contact with the first brazing alloy.

According to another characteristic of the production method, the first brazing alloy is a sheet and during step b) a layer of metal material is applied to the two faces of the sheet of the first brazing alloy with these two faces respectively brought into contact with one of the faces of the ceramic plate and one of the faces of the substrate plate.

According to another characteristic of the production method, the metallization of step b) consists in applying a coat of metallic paint.

According to another characteristic, a silver-copper alloy containing less than 60% of silver by volume is used as a low-temperature brazing alloy.

According to another characteristic, the hi-temperature vacuum brazing of step c) takes place at a temperature included between 760° C. and 820° C.

According to another example of implementation, bracing at atmospheric pressure in step e) takes place at a temperature included between 560° C. and 620° C.

The production method conforming to the invention uses a brazing flux to process the corresponding faces prior to brazing at atmospheric pressure.

According to an implementation example, the cutting inserts attached to the tool body are sharpened mechanically using an abrasive grinder.

The purpose of the invention is also a process for the repairing of a cutting tool obtained according to the previously described manufacturing process to replace a damaged cutting insert, characterized in that it consists in:

heating locally, at atmospheric pressure, the tool to destroy the brazing between the substrate of the damaged cutting insert and the tool body; and attaching a new cutting insert to the tool body by local brazing at atmospheric pressure and low temperature, with the second brazing alloy to ensure that the substrate joins the new cutting insert to the tool body According to one characteristic, the cutting tool is heated locally by electromagnetic induction.

The purpose of the invention is also a method for producing a cutting insert based on a ceramic oxide material designed to be made integral with a metal body to form a cutting or a machining tool, characterized in that it consists in:

a') using a ceramic plate and a metal substrate plate of more or less the same size, b') connecting with an initial brazing alloy the ceramic plates and the metal substrate plate and with a deposit of at least one coat of metal material between at least the ceramic plates and the first brazing alloy, c') attaching the ceramic plate to the substrate plate by vacuum brazing and at high temperature, by using the first brazing alloy; and d') cutting in the assembly obtained in this way, at least one insert consisting of the cutting insert covered by the substrate over the entirety of one of its faces.

According to one characteristic of the production method, the cutting insert is cut by using a high-pressure jet of water, a laser or an abrasive diamond disk.

Using a tool produced according to the invention, it is easy to replace a worn or deteriorated cutting insert. Connections between the other cutting plates are not affected because the repair stage is performed locally and at low temperature. Repair and maintenance are carried out at ambient temperature and atmospheric pressure without any need for specific installations such as a furnace or a vacuum generating installation. The result is that the maintenance cost is substantially decreased.

The stress is related to differential thermal dilatation are minimal meeting and increased life duration for the connections between the cutting inserts and the tool body.

The attachment of the cutting inserts to the tool body is carried out at low temperature, reducing the risk of the de-tempering of the tool body.

Contrary to expectations, the machined edges obtained with the tools according to the invention are sufficiently accurate and linear in terms of surface quality and machining result, in particular for parts machined of wood base composite material.

In addition, tool repairers are not obliged to have a high-temperature furnace producing a vacuum. They simply need to procure ceramic plate-substrate assemblies which will then be cut.

Replacing several deteriorated cutting inserts on a tool according to the invention is carried out individually and successively using, for instance, the same means retaining means such as a robotized arm. A complex shape tool can be repaired in as economic a manner as a simple shape tool.

The bond obtained by high-temperature brazing in a vacuum is more advisable for bonding dissimilar materials such as a ceramic material and a metal substrate. It is then possible to choose a ceramic material from a great number of ceramic oxide grades.

Accordingly, ceramic oxide grades that could not be attached to a tool body by a low-temperature brazing can be attached to an intermediate substrate, thanks to a high-temperature brazing operation.

ILLUSTRATIONS

This invention will be described in greater detail in the following by means of examples of cutting inserts according to the invention, tools equipped with these inserts and a method of producing cutting inserts, cutting tools and of replacing a worn cutting insert on a tool, shown in the attached illustrations in which.

DESCRIPTION OF PRODUCTION METHODS

Figure 1:
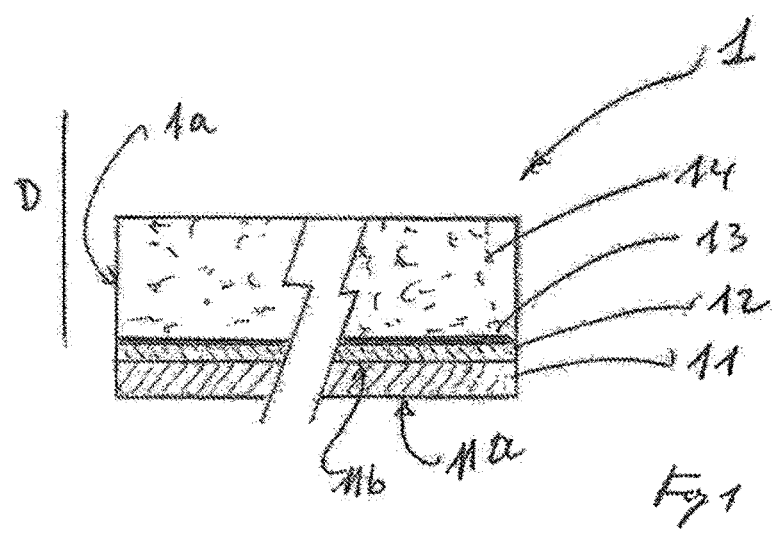
FIG. 1 is a schematic sectional view at an enlarged scale of a first embodiment of a cutting insert according to the invention.

According to FIG. 1, the purpose of the invention is a cutting insert 1 represented schematically and at a much enlarged scale, in a sectional view. Direction D is the thickness of plate 1. Plate 1 the consists of a metal substrate 11 having a fastening surface 11 for attaching a plate 1 to the cutting tool body and a brazing surface 11*b*. The brazing surface 11 *b* is covered by a high-temperature braised alloy layer 12 itself covered or connected to a ceramic plate 14 by means of a metal layer 13. All these components 11, 12, 13, 14, assembled by brazing, have a substantially rectangular shape with the ceramic plate 14 covering the surface of the metal substrate 11. One or several faces of cutting insert 1 are sharpened, where applicable (the sharpened surface bears as an example the reference 1*a*).

Figure 2:
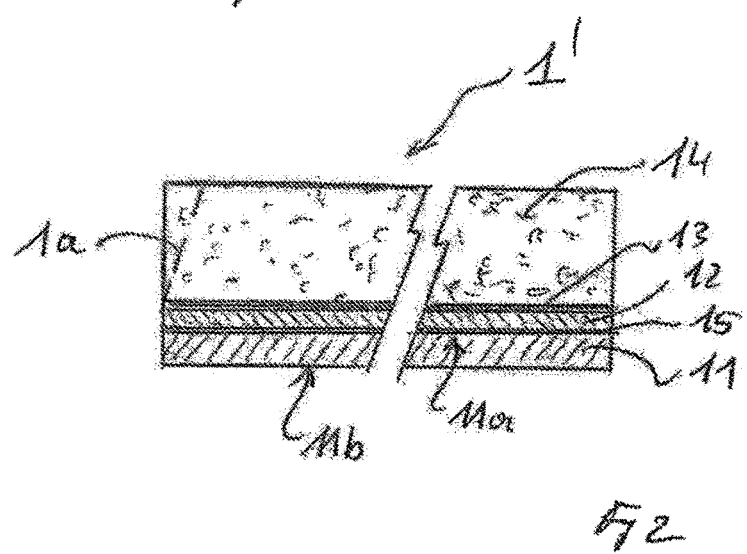
FIG. 2 is a similar sectional view to FIG. 1 of an alternative embodiment of a cutting insert.

FIG. 2 is a sectional view similar to that of FIG. 1 of an alternative cutting insert 1' differing from cutting insert 1 of the FIG. 1 only in the presence of a second metal layer 15 between fastening surface 11 *a* of metal substrate 11 and the high-temperature braised alloy layer 12. The other components are identical or similar to those of FIG. 1 and bear the same references. Their description will not be repeated.

The metal substrate 11 is a steel plate, of nickel steel C45, of tungsten carbide WC—Co.

The high-temperature braised alloy layer 12 is a silver-copper Ag—Cu alloy having a silver content in excess of 50% by volume or otherwise and alloy 49Ag 27.5Cu 20.5Zn 2.5Mn 0.5Ni. It can be an Ag—Cu alloy with the addition of Zn, Mn and Ni. The ceramic plate 14 is of alumina $\alpha$-$Al_2O_3$ or of zirconia-yttria 3Y—$ZrO_2$.

Figure 3:
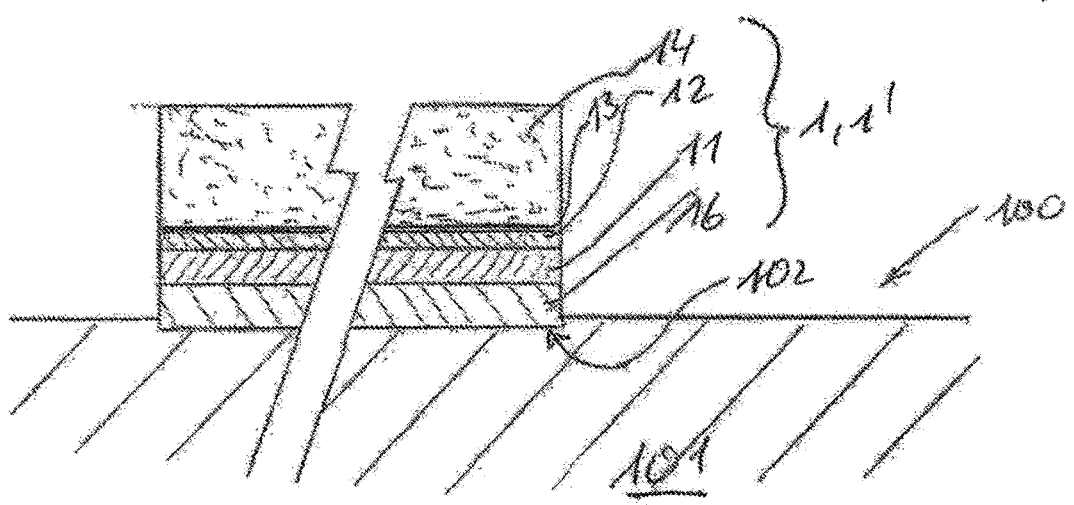
FIG. 3 is a sectional view of a cutting insert according to the invention.

FIG. 3 shows very schematically and in a much enlarged sectional view, a cutting tool 100 in location 102 of cutting insert 1. This tool 100 includes or many cutting plates depending on the work to be done with the tool 100. The cutting inserts 1, 1' are of identical or different sizes. The cutting inserts 1, 1' are connected to the body 101 of the cutting tool 100 at locations 102 by brazing with a low temperature brazed alloy layer 16. This low-temperature brazing alloy 16 is a silver-copper alloy Ag—Cu containing at least 60% by volume of silver Ag.

The plates 1, 1' are obtained by casting plates of larger sizes having the same layer structure as the plates 1, 1' described above and whose production method will be described in FIGS. 9 to 11.

Figure 4:
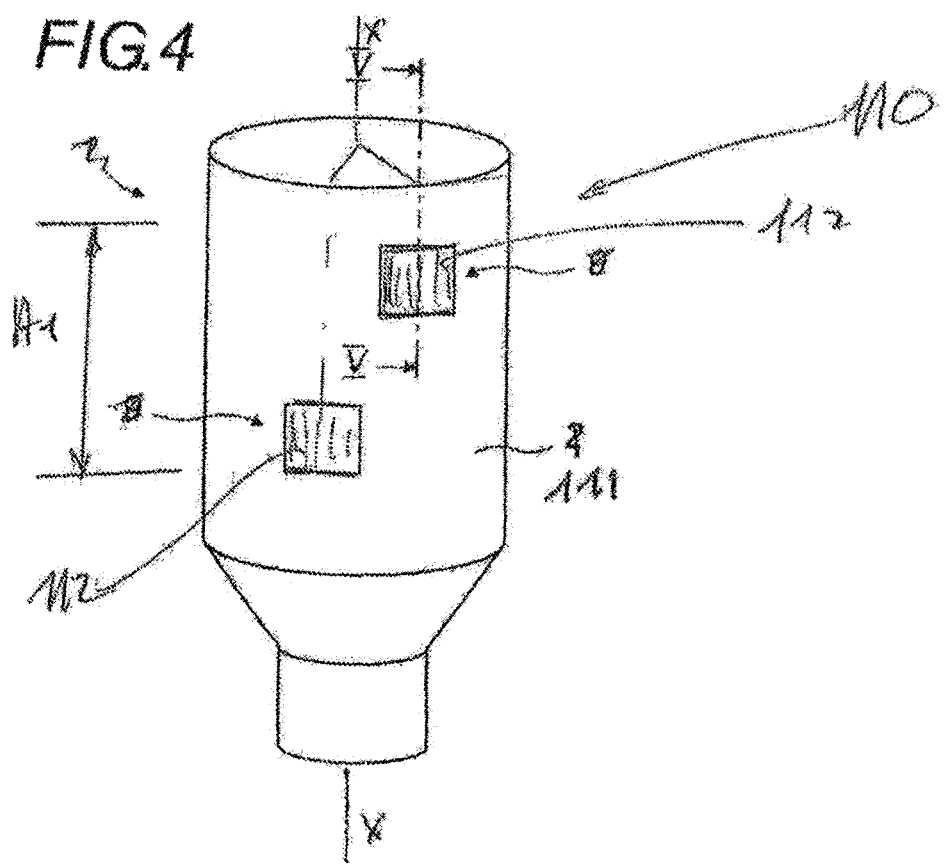
FIG. 4 is a schematic view of an example of a cutting tool according to the invention.

FIG. 4 shows a tool 110 in the form of a cutter on an axis xx of which the cylindrical body 111 is provided with cutting plates 112 according to the invention. These cutting plates 112 are rectangular or square, similar to the plates 1, 1' of FIGS. 1-3. Only two plates are shown whereas in reality the body 111 of the tool comprises several plates 112 set out regularly on the perimeter but also in the direction of axis of rotation xx, for instance, by the alternating arrangement from one crown of plates to the next, to regulate and densify the peripheral distribution of the plates and give the cutter 110 a height H1 corresponding to the axial length on which the plates 112 are distributed.

The plates 112 are connected to the body 111 by brazing as indicated in FIG. 3, carried out using a low temperature brazing alloy allowing the local de-brazing of a damaged cutting insert 112 and its replacement by a new plate 112 which will be attached by local brazing.

Figure 5:
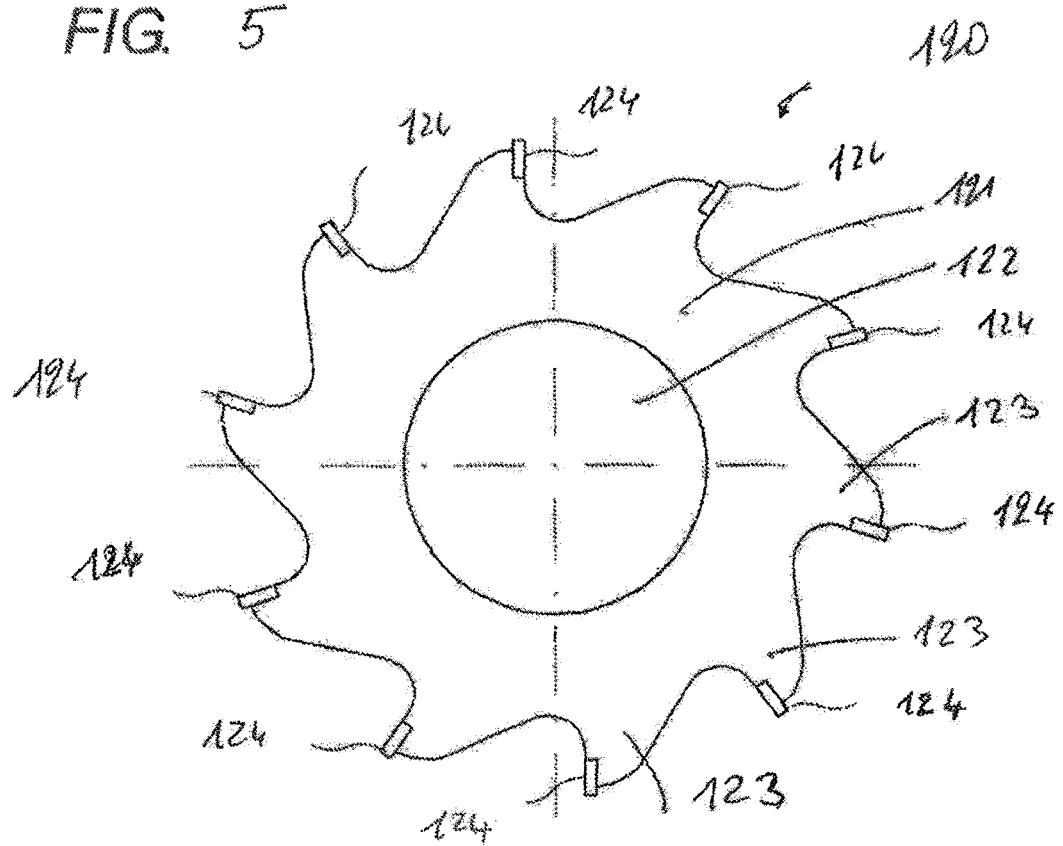
FIG. 5 is a plan view of a saw blade according to the invention.

FIG. 5 is a plan view of a circular saw disc 120 consisting of a body 121 with an attaching hole 122 and peripheral teeth 123 each provided with a cutting insert 124. These plates 124 are attached to the teeth 123 by low-temperature brazing according to the invention, allowing local brazing/de-brazing.

Figure 6:
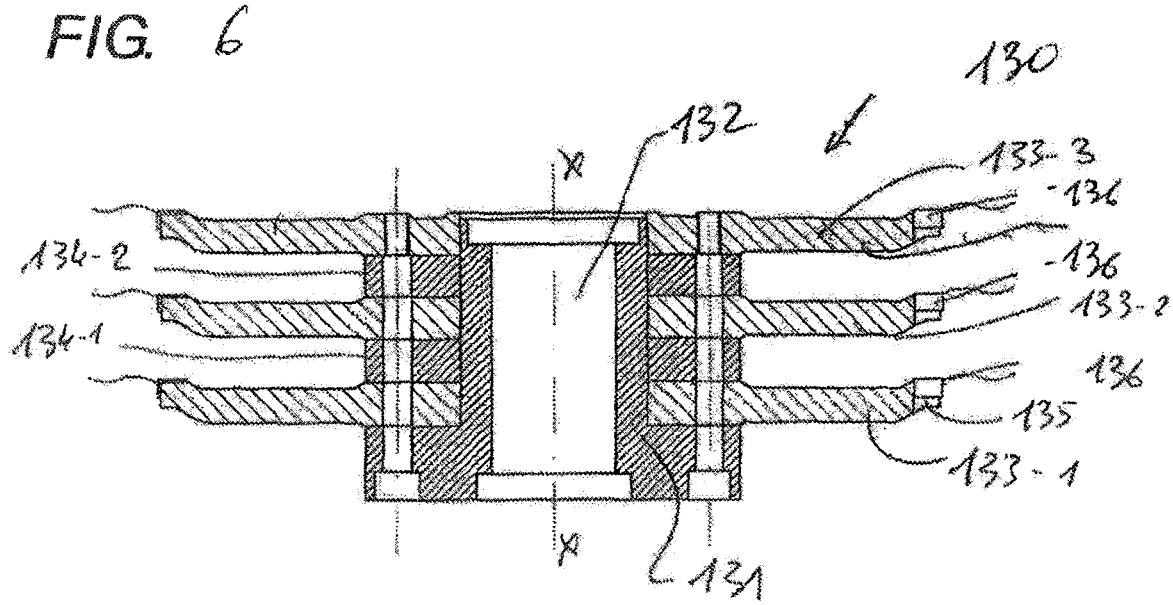
FIG. 6 is an axial sectional view of a finishing cutter according to the invention.

FIG. 6 is an axial sectional view (xx axis) of a cutter 130, for instance a finishing cutter consisting of a hub 131 provided with a bore 132 for its installation on a machine shaft. The hub 131 supports a stack of cutting discs 133-1, 133-2, 133-3 separated by shims 134-1, 134-2 depending on the application, that is, for instance, by the thickness of the plate or the panel to be machined with the cutter.

The discs 133-1, 133-2, 133-3 are similar to the saw discs, provided with peripheral teeth 135, each having a cutting insert 136. Without exception, the discs 131-1, 131-2, 131-3 are identical, locked in rotation about the xx axis and preferably offset angularly with respect to one another about the xx Axis said that this cutter is as balanced as possible in its rotation about its axis.

The assembly formed in this way is locked by interconnecting means that are not shown.

The finishing cutter 130 installed on the machine shaft works only with one cutting disc at a time. The cutter is positioned so that the cutting disc is brought into the active position by the movement of the shaft along the xx axis. Once the plates 136 of the cutting disc (133-$n$) become worn, the shaft is moved longitudinally along its xx axis by one increment to position another disc 133-$n$ in the appropriate position and work with this disc and so on, until all the discs (or their cutting inserts) are worn. Only at this time is the cutter replaced by a new sharpened cutter.

Figure 7:
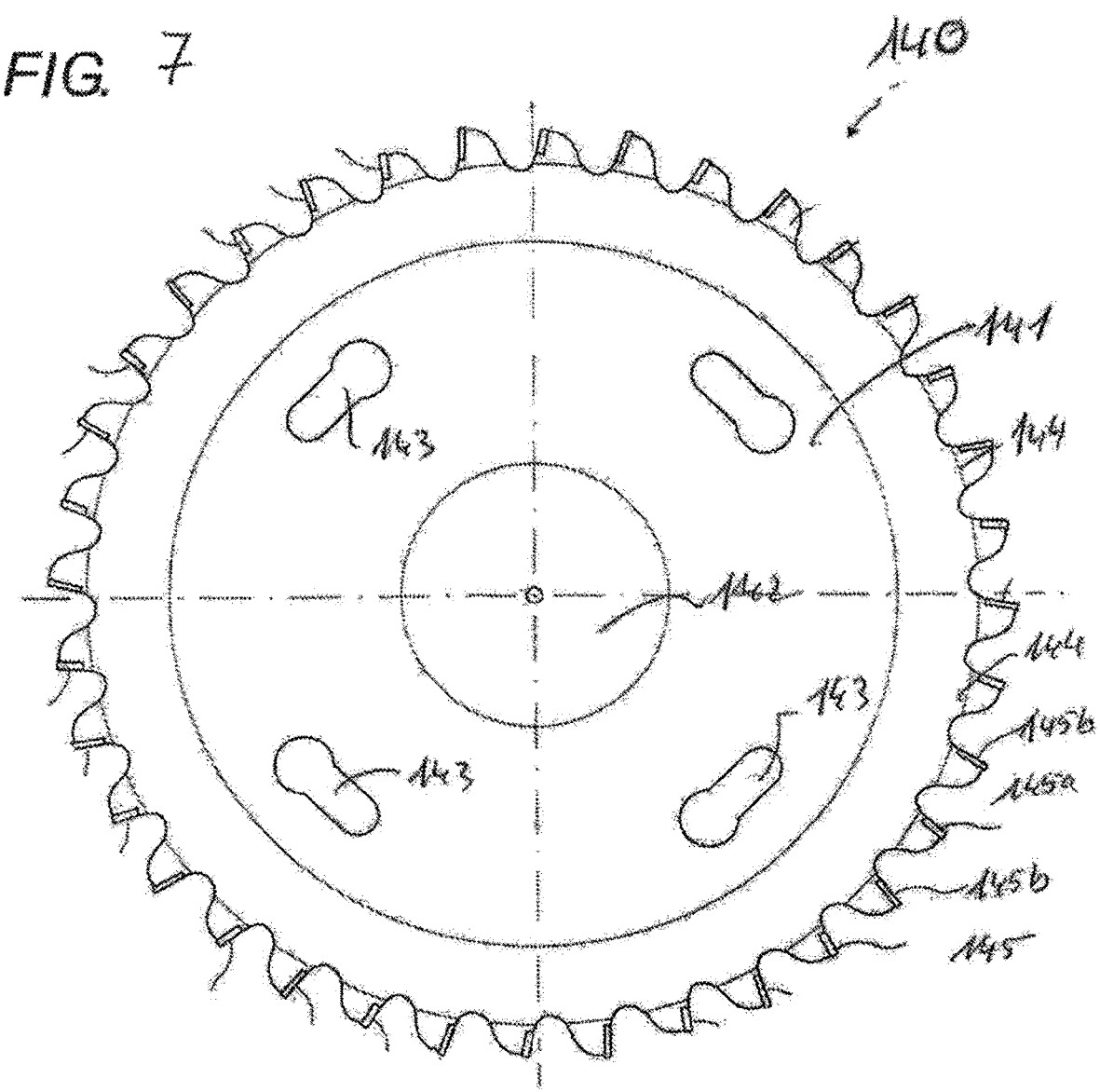
FIG. 7 is a plan view of a tearing device according to the invention including two types of size cutting plates and of different sizes.

FIG. 7 shows another tool 140, such as a tearing tool 140, similar to a circular saw disc. This tool 140 has a body 141 with an assembly hole 142 and rotation locking holes 143. The perimeter of the body includes a great number of teeth 144 provided with two series of cutting plates 145$a$, 145$b$ of different sizes.

These cutting plates 145$a$, 145$b$ are attached to the teeth 144 by low-temperature brazing for soliciting not only the production but also the repair of damaged or removed teeth, for their replacement by new plates.

Figure 8:
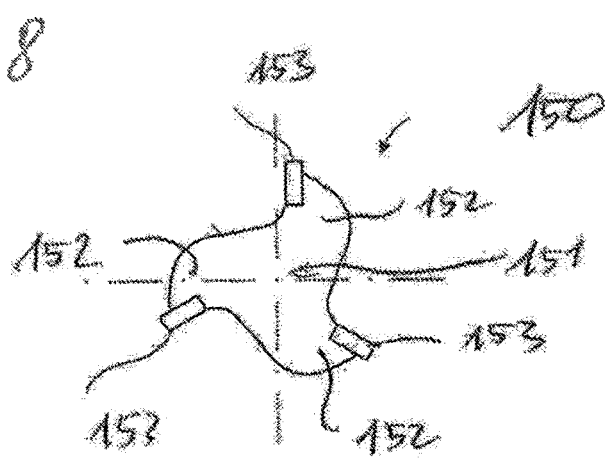
FIG. 8 is a plan view of a routing cutter according to the invention.

FIG. 8 is a plan view of a routing cutter 150 consisting of a body 151 with three teeth 152 each provided with a cutting insert 153 attached by a low-temperature brazing.

To summarize, FIGS. 5 to 8 are a schematic representation of the cutting tool which, according to the invention, is a circular saw blade 120, a grooving blade, a finishing cutter 130, a tearing tool 140, a routing cutter 150, a borehole milling tool, a shank milling tool, a drill bit, or any other tool for working wood or composite materials by the removal of matter.

The same cutting tool may include several plates, also called inserts, brazed onto the body of the tool at angles and in positions specific to the application of the tool. The same cutting tool may include plates or inserts 1, 1' of different compositions or different sizes as shown in FIG. 7 and which may all be brazed onto tool body 141 during the same step, or during two successive brazing steps. In this case, initial brazing is at a temperature suited to an insert of a given composition whereas the second brazing is at a temperature adapted to an insert having another composition, the second temperature being lower than the first in order not to deteriorate the previous brazing.

Figure 9:
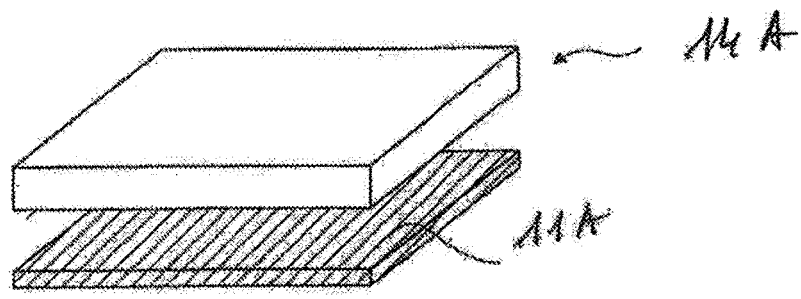
FIGS. 9-11 are schematic illustrations of the successive steps of the production method of cutting inserts according to the invention.
Figure 10:
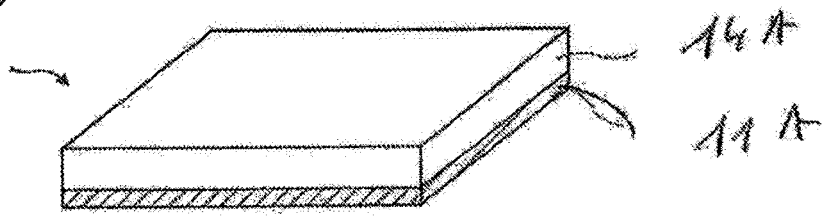
Figure 11:
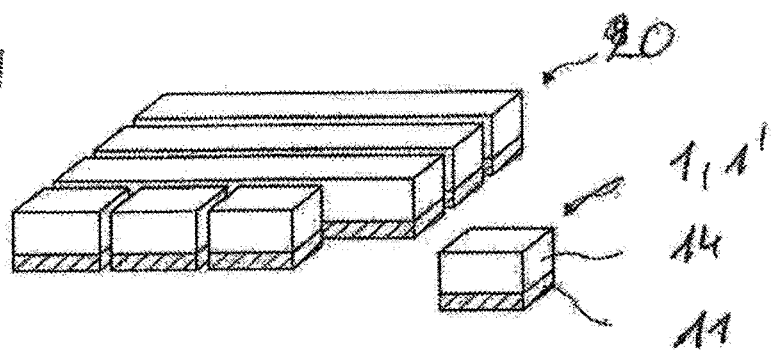

FIGS. 9 to 11 show the various stages for the production of a cutting insert 1, 1' for a metal tool body designed to be mounted to a machine and at least one cutting insert integral with the tool body.

For the description of the process the steps of which are schematized in FIGS. 9 to 11, reference will also be made to the highly simplified FIGS. 1 to 3 for the structural components of the cutting insert 1, 1'. The numerical references of these components will be reused, followed by the suffix A for the purpose of the description without these references all being entered into the FIGS. 9 to 11.

Accordingly, the metal plate of the substrate will bear reference 11A, the ceramic plate will bear reference 14A, the high-temperature brazing alloy will bear reference 12A, the first metallizing layer will bear reference 13A and the second metallizing layer will bear reference 15A. The various parts will have the suffix A assigned to their reference because they are composition components subsequently found in the cutting inserts 1, 1'. These plates are also called "inserts" because the cutting plates are attached to tool body 101 by brazing 16.

In a first step a) (FIG. 9), we use a ceramic plate 14A and a metal substrate plate 11A of substantially the same size.

The ceramic plate 14A is preferably made with at least one ceramic oxide grade chosen from the family of ceramic grades including alumina α-$Al_2O_3$, and zirconia-yttria 3Y-$ZrO_2$ or a mixture of such ceramic oxide grades.

The metal substrate plate 11A is preferably made of a material chosen from tungsten carbide and steel and more particularly tungsten carbide WC—Co and nickel steel C45.

The ceramic plate 14A and the metal substrate plate 11A each preferably thickness included between 0.5 and 5 mm and even more preferably thickness of approximately 3 mm.

During a second step b), a coat of metal material is deposited between the ceramic plate 21 and a first brazing alloy which will be used during a subsequent brazing stage c). This coat of metal material is deposited on at least one of the surfaces in contact during step c).

Similarly, during the second step b). A coat of metal material is deposited between the metal substrate plate 11A and the first brazing alloy 15A.

This coat of metal material is deposited on at least one of the surfaces in contact during step c).

These metallization codes provide a better bond with the brazing alloy for the ceramic plate 14A and for the metal substrate plate 11A.

The deposit of this metal material, preferably in the form of a paint, is performed by all known means.

According to an alternate implementation, during the second step b), the ceramic plate 14A is lined on one of its faces 6 with a coat of metal material to carry out metallization as on one of the faces of the metal substrate plate 11A.

According to another alternate implementation, for a brazing alloy used in the form of a metal sheet, during the second step b) this brazing alloy sheet is lined on its two faces with a coat of metal material for metallization purposes.

According to another alternative, if the brazing alloy used during the brazing of the third step consists of a metal sheet, in the course of the second step b), this brazing alloy sheet may be aligned on one face with a coat of metal material for metallization purposes while the ceramic plate 14A or the metal substrate plate 11A designed to be in contact with the non-metallized face of the said brazing alloy sheet can also be lined on one of its faces or with a coat of metal material.

During a third step shown in the FIG. 10, the ceramic plate 14A is attached to the substrate plate 11A by vacuum brazing and at high temperature. This brazing is carried out by means of a high-temperature brazing alloy 15A, for instance a silver-copper alloy preferably comprising more than 50% of silver by volume, or a silver-indium-titanium based alloy. High-temperature vacuum brazing is carried out, for instance, at a temperature included between 760° C. and 820° C.

During a fourth step shown in the FIG. 11, from assembly 20 obtained in this way, a cutting insert 1, 1' is cut out, covered by the substrate 11 on all of one of its faces. The cutting is carried out by means of a jet of water under pressure, a laser or a diamond disk.

During an intermediate step, the plate 1,1' is ground by the removal of matter, in particular to sharpen the cutting insert, set an angle of inclination on the upper face of ceramic plate 14, and/or reduce at least one dimension of plate 1, 1'. After grinding, the plate 1, 1' thickness is preferably between 0.5 and 5 millimetres, and more preferably, approximately 3 millimetres.

During a fifth step shown in FIG. 11, the plate 1, 1' is attached to the tool body 101 by atmospheric pressure brazing at low temperature to make substrate 11 integral with tool body 101. Brazing is carried out using a low-temperature brazing alloy, for instance a silver-copper alloy comprising preferably less than 60% silver by volume, at atmospheric pressure and low temperature, for instance included between 560° C. and 620° C.

In the field of brazing, a temperature of less than 650° C. is considered low and a temperature of more than 750° C. is considered high.

This operation does not require the prior metallizing of the surfaces to be braised but brazing flux can be used to process the corresponding faces before brazing at atmospheric pressure. Indeed, habitually, the tool body 101 is, for instance, based on steel 16MnCr5 or steel C45, that is liable to oxidize, detrimental to the brazing process. The fine coat of oxide can be removed by brazing before filing and the application of a flux: This stripper can be applied by swabbing.

In a last possible step, the manufacturing of a cutting tool 100 involves the mechanical sharpening of the cutting inserts 1', 1' attached to tool body 101, using for instance an abrasive grinder.

The invention also concerns the process for repairing a cutting tool 100, obtained according to the previously described production method.

This repair method consists initially in locally heating, at atmospheric pressure, the tool 100 to destroy the brazing 16 between the substrate 11 of deteriorated cutting insert 1, 1', and tool body 102, then attaching a new cutting insert 1, 1' to the tool body 102 by local brazing at atmospheric pressure and at low temperature. Low-temperature brazing alloy 16 is used to make substrate 11 of the new cutting insert 1, 1' integral with the tool body 102.

Preferably, the local heating of cutting tool 100 is carried out by electromagnetic induction.

As an illustration, examples of the implementation of production methods of a cutting tool 100 according to the invention are given below:

Example 1

A ceramic plate consisting of 100% alumina $\alpha$-$Al_2O_3$ is lined on one face with a coat of metal paint.

A tungsten carbide metal plate WC—Co with at least 30% of Co measuring the same size is also lined on one side with a coat of metal paint.

The metallized face of the ceramic plate is then attached in vacuum and at 810° C. to the metallized face of the tungsten carbide metal plate by a brazing operation. This brazing is carried out using a silver-copper filler alloy comprising more than 50% silver and in particular 72% of Ag by volume.

The assembly obtained in this way is then cut into cutting inserts by means of a jet of water under pressure, a laser or a diamond disk.

Inserts each having a cutting insert are then attached together by their substrate to the tool body by brazing at atmospheric pressure and at a temperature included between 560° C. and 620° C. This brazing is carried out using an electromagnetic inductor and a silver-copper brazing alloy comprising less than 60% silver by volume.

Example 2

A ceramic plate consisting of 100% zirconia-yttria 3Y-$ZrO_2$ is lined on one face with a coat of metal paint.

A metal plate of nickel steel C45 of the same size is also lined on one face with a coat of metal paint.

The metallized face of the ceramic plate is then attached in vacuum at 780° C. to the metallized face of the metal tungsten plate by brazing using a silver-copper alloy comprising more than 50% silver by volume.

The assembly obtained in this way is then cut into cutting inserts by means of a jet of water under pressure, a laser or a diamond disk.

Inserts each having a cutting insert are then attached together by their substrate to the tool body by brazing at atmospheric pressure and at a temperature included between 560° C. and 620° C. This brazing is carried out using an electromagnetic inductor and a silver-copper brazing alloy comprising less than 60% silver by volume.

Example 3

A ceramic plate is used comprising 90% alumina $\alpha$-$Al_2O_3$ and 10% zirconium ZrO2 wind on one of its faces with a coat of metal paint and a metal tungsten plate WC-30Co of the same size with a coat of metal paint on one face.

The metallized face of the ceramic plate is then attached in vacuum at 800° C. to the metallized face of the metal tungsten plate by brazing using a silver-copper alloy comprising more than 50% silver by volume.

The assembly obtained in this way is then cut into cutting inserts by means of a jet of water under pressure, a laser or a diamond disk.

Inserts each having a cutting insert are then attached together by their substrate to the tool body by brazing at atmospheric pressure and at a temperature included between 560° C. and 620° C. This brazing is carried out using an electromagnetic inductor and a silver-copper brazing alloy comprising less than 60% silver by volume.

NOMENCLATURE

1 Cutting insert
1 *a* Unsharpened surface
1*b* Unsharpened surface
11 Metal substrate
11 *a* Brazing surface
11*b* Attaching surface
12 High temperature brazing alloy
13 Metal layer
15 Metal layer
16 High temperature brazing alloy
11A Metal plate
12A High temperature brazing alloy sheet
13A Metal layer
14A Ceramic plate
15A Metal layer
20 Assembly
100 Cutting tool
101 Tool body
102 Location of cutting insert 1, 1'
110 Cutter
111 Body
112 Cutting insert 120 Circular saw disk
121 Body
122 Attaching hole
123 Peripheral tooth
124 Cutting insert
130 Finishing cutter
131 Hub
132 Bore
133_1, 133_2, 133_2, Cutting disks
134_1, 134_2, Shims
135 Peripheral tooth
136 Cutting insert
140 Tearing tool
141 Body
142 Assembly hole
143 Rotation locking hole
144 Tooth
145a, 145b Cutting plates
150 Routing cutter
151 Body
152 Tooth
153 Cutting insert
D Thickness direction of cutting insert
H1 Working height
xx Tool axis

The invention claimed is:

1. Cutting insert for brazing onto a cutting tool body for working wood-based composite materials, the cutting insert comprising:
- a substrate (11) in the form of a plate with a fastening surface (11 a) to the cutting tool body, where the substrate (11) includes tungsten carbide, steel, nickel steel, or a tungsten carbide-cobalt composite,
- a high-temperature brazing alloy layer (12)
- an intermediate metal layer (13)
- a ceramic plate (14) that consists of alumina ($Al_2O_3$), zirconia, zirconia-yttria, or a combination thereof, the ceramic plate (14) having the same dimensions as the substrate (11),
- the high-temperature brazing alloy layer (12) connecting the substrate (11) to the ceramic plate (14) by means of the intermediate metal layer (13), where the intermediate metal layer (13) is between the ceramic plate (14) and the high-temperature brazing alloy layer (12), and
- the high-temperature brazing alloy (12) is an alloy of silver-copper with more than 50% by volume of silver or an alloy of silver, indium, and titanium.

2. The cutting insert according to claim 1, characterized in that the substrate (11) is connected to the high-temperature brazing alloy layer (12) by means of a metal layer (15) comprising titanium.

3. The cutting insert according to claim 1, characterized in that the substrate (11) includes steel, nickel steel C45, or a tungsten carbide-cobalt composite.

4. Cutting tool comprising a rotary metal tool body (101), said body having an active surface that is aligned with two or more of the cutting inserts (1, 1') according to claim 1, the cutting tool characterized in that the cutting inserts (1, 1') are connected to the tool body (101) by a low-temperature brazing alloy layer (16), where the low-temperature brazing alloy layer (16) is between the active surface of the tool body (101) and the substrates (11) of the cutting inserts (1, 1').

5. The cutting tool according to claim 4, characterized in that the low-temperature brazing alloy is a silver-copper alloy containing at least 60% by volume of silver.

6. Production method of a cutting tool for working wood-based composite materials, the method comprising:
- a) using a ceramic plate (14) consisting of alumina ($Al_2O_3$), zirconia, zirconia-yttria, or a combination thereof, and a substrate (11) that includes tungsten carbide, steel, nickel steel, or a tungsten carbide-cobalt composite, the ceramic plate (14) having the same dimensions as the substrate (11),
- b) applying an intermediate metal layer (13) to the ceramic plate (14),
- c) applying a high-temperature brazing alloy (12) between the intermediate metal layer (13) and the substrate (11),
- d) brazing the ceramic plate (14) to the substrate plate (11) by high-temperature vacuum brazing with the high-temperature brazing alloy (12), the high-temperature brazing alloy (12) being an alloy of silver-copper with more than 50% by volume of silver or an alloy of silver, indium, and titanium, to form an assembly (20),
- e) cutting out of the assembly (20) obtained in this way a cutting insert (1 or 1'),
- f) brazing the cutting insert (1 or 1') on to a tool body by brazing at atmospheric pressure, at low temperature, with a low temperature brazing alloy, to form the cutting tool.

7. The production method according to claim 6, characterized in that the step b) of applying the intermediate metal layer (13) to the ceramic plate (14) includes applying a coat of metallic paint.

8. The production method according to claim 6, characterized in that the vacuum brazing of step d) is carried out at a high temperature included between 760° C. and 820° C. and the brazing at atmospheric pressure in step f), is carried out at the low temperature included between 560° C. and 620° C.

9. The production method according to claim 6, further comprises a step of applying a brazing flux to the cutting insert (1 or 1') and the tool body before step f) of brazing at atmospheric pressure.

10. The production method according to claim 6, further comprising the step of sharpening the cutting inserts (1 or 1') using an abrasive grinder.

11. Process for repairing the cutting tool of claim 4, by replacing a cutting insert that has deteriorated, the process comprising:
- heating locally, at atmospheric pressure, the cutting tool to destroy the low-temperature brazing alloy layer between the substrate of the cutting insert that has deteriorated and the tool body; and
- attaching a new cutting insert having a substrate to the tool body by local brazing at atmospheric pressure and low temperature to form a new low-temperature brazing alloy layer between the substrate and the tool body.

12. The process of claim 11, wherein the step of heating the cutting tool to destroy the low-temperature brazing alloy layer comprises electromagnetic induction.

* * * * *